United States Patent
Yanagidaira et al.

(10) Patent No.: US 9,929,575 B2
(45) Date of Patent: Mar. 27, 2018

(54) ELECTRICAL APPARATUS

(75) Inventors: Daiki Yanagidaira, Tokyo (JP); Tsuyoshi Ohashi, Tokyo (JP); Tsukasa Takahashi, Fukushima (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 874 days.

(21) Appl. No.: 14/236,327

(22) PCT Filed: Aug. 2, 2012

(86) PCT No.: PCT/JP2012/069661
§ 371 (c)(1),
(2), (4) Date: Jan. 30, 2014

(87) PCT Pub. No.: WO2013/018852
PCT Pub. Date: Feb. 7, 2013

(65) Prior Publication Data
US 2014/0191590 A1 Jul. 10, 2014

(30) Foreign Application Priority Data
Aug. 2, 2011 (JP) .................................. 2011-168965

(51) Int. Cl.
*H02J 7/00* (2006.01)

(52) U.S. Cl.
CPC .......... *H02J 7/0032* (2013.01); *H02J 7/0063* (2013.01); *H02J 2007/0067* (2013.01); *Y10T 307/858* (2015.04)

(58) Field of Classification Search
CPC .......... H04L 9/3273; H04L 9/00; H02J 9/005; H02J 7/00; H01M 10/48; H01M 10/42; H03K 17/687

(Continued)

(56) References Cited

U.S. PATENT DOCUMENTS 5,608,306 A * 3/1997 Rybeck ................. H02J 7/0004
320/106
6,492,791 B1 * 12/2002 Saeki .................. H01M 10/425
320/118

(Continued)

FOREIGN PATENT DOCUMENTS

CN 102013706 A 4/2011
EP 2317598 A1 5/2011

(Continued)

OTHER PUBLICATIONS

Partial translation of the office action for corresponding Japanese patent application No. 2013-526952 dated Apr. 21, 2015.

(Continued)

*Primary Examiner* — Rexford Barnie
*Assistant Examiner* — Elim Ortiz
(74) *Attorney, Agent, or Firm* — Hubbs, Enatsky & Inoue PLLC

(57) ABSTRACT

An electrical apparatus is provided which can reduce, when it is shipped in a state in which a secondary battery is built therein, power consumption before a user starts to use the electrical apparatus first. The electrical apparatus includes a secondary battery, a load which operates by power supplied from the secondary battery, and a switch element disposed between the secondary battery and the load. The switch element remains in an off state until a user starts use of the electrical apparatus.

6 Claims, 3 Drawing Sheets

(58) Field of Classification Search
USPC .......................... 713/155; 327/427; 320/136
See application file for complete search history.

(56) References Cited

U.S. PATENT DOCUMENTS

| | | | |
|---|---|---|---|
| 2006/0117176 A1 | 6/2006 | Sasaki et al. | |
| 2010/0097118 A1 | 4/2010 | Wang et al. | |
| 2010/0194348 A1 | 8/2010 | Wang et al. | |
| 2011/0057622 A1* | 3/2011 | Kim | H01M 10/425 320/137 |
| 2013/0257385 A1* | 10/2013 | Kim | H01M 10/425 320/134 |

FOREIGN PATENT DOCUMENTS

| | | |
|---|---|---|
| JP | 05-027056 A | 2/1993 |
| JP | H05-91226 A | 4/1993 |
| JP | H06-67749 A | 3/1994 |
| JP | H11-339862 A | 12/1999 |
| JP | 2002-272008 A | 9/2002 |
| JP | 2006-180457 A | 7/2006 |
| JP | 2006-180460 A | 7/2006 |
| JP | 2011-055603 A | 3/2011 |
| JP | 2011-062070 A | 3/2011 |

OTHER PUBLICATIONS

The translation of OA for corresponding Chinese Patent Application No. 201280036331.X dated Jun. 11, 2015.
The Search Report for corresponding European patent application No. 12820805.5. dated Jul. 14, 2015.
International Search Report for PCT/JP2012/069661 dated Oct. 9, 2012, concise explanation of relevance of EP2317598A1, JP05-027056A and JP2011-055603A.
English Translation of Written Opinion of the International Searching Authority for PCT/JP2012/069661 accompanied with PCT/IB/373 and PCT/IB/338 dated Feb. 13, 2014, acting as concise explanation of previously submitted reference(s).

* cited by examiner

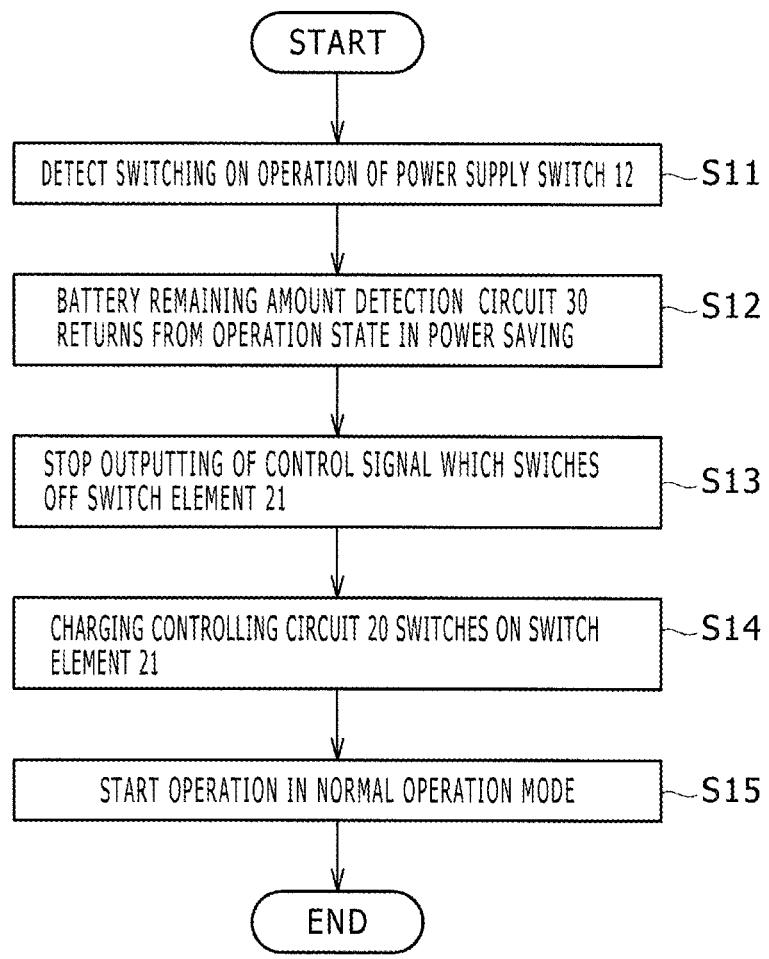

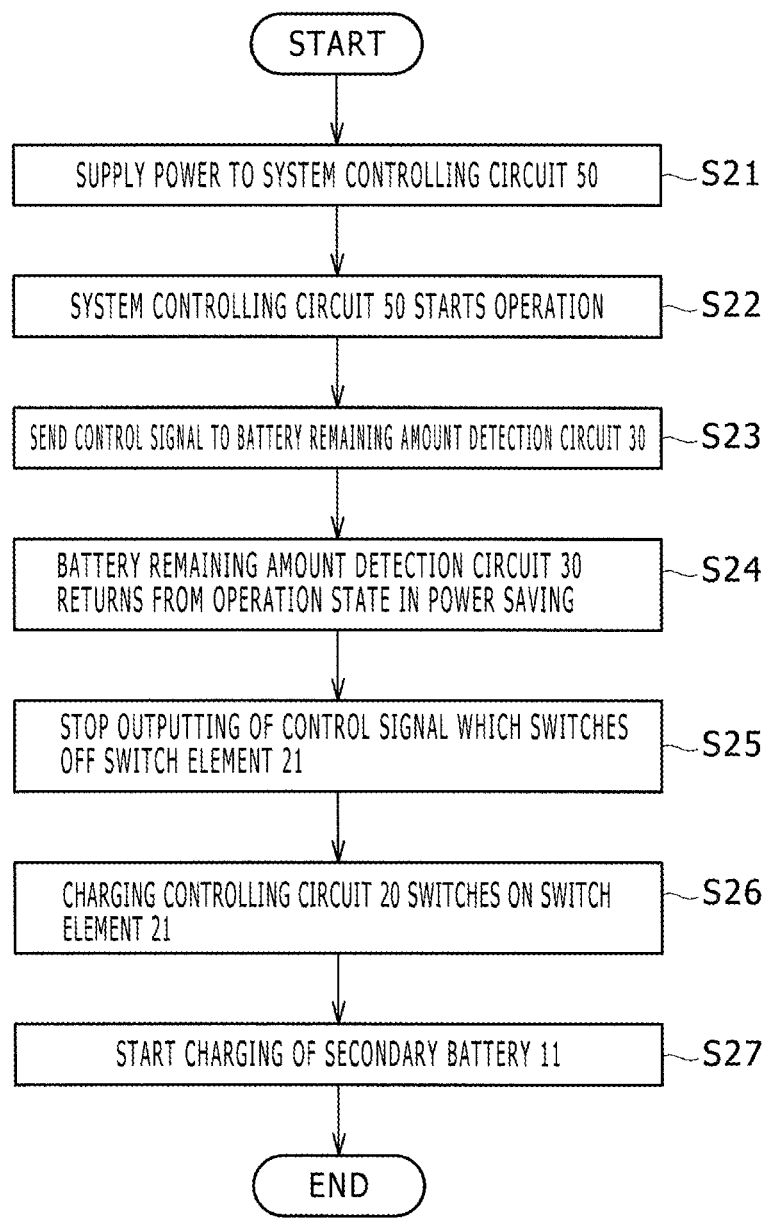

ELECTRICAL APPARATUS

CROSS REFERENCE TO RELATED APPLICATIONS

This application is a National Stage of International Application No. PCT/JP2012/069661 filed Aug. 2, 2012, claiming priority based on Japanese Patent Application No. 2011-168965 filed on Aug. 2, 2011. The contents of each of the above documents are incorporated herein by reference in their entirety.

TECHNICAL FIELD

The present invention relates to an electrical apparatus which operates with power supplied from a secondary battery.

BACKGROUND ART

Electrical apparatuses are known which operate by the power supplied from a secondary battery built therein (refer to, for example, Patent Literature 1). Among such electrical apparatus, some electrical apparatus is shipped in a state in which a secondary battery is built in an electrical apparatus main body. Such a system as just described can simplify packing of the product. Further, in the first place, if a secondary battery is built in a main body of an electrical apparatus in a form in which it cannot be removed from the main body, then the structure of a housing of the electrical apparatus can be simplified and the electrical apparatus can be miniaturized.

CITATION LIST

Patent Literature

[PTL 1]
U.S. Patent Application Publication No. 2006/117176

SUMMARY

If a secondary battery is built in an electrical apparatus main body, then even in a state in which the electrical apparatus is not operative, electric current flows through a pull-up resistor included in electric circuitry in the electrical apparatus. Consequently, electric power is consumed little by little and the capacity of the secondary battery decreases. Therefore, if a long period of time elapses after the electrical apparatus is manufactured and shipped until a user actually starts to use the electrical apparatus, then there is the possibility that, when the user tries to start use of the electrical apparatus, the battery capacity may be insufficient, resulting in failure to use the electrical apparatus soon.

The present invention has been made taking the subject described above into consideration, and one of objects of the present invention resides in provision of an electrical apparatus which can reduce, when the electrical apparatus is shipped in a state in which it has a secondary battery built therein, the power consumption before a user starts to actually use the electrical apparatus.

According to the present invention, there is provided an electrical apparatus including a secondary battery, a load which operates by power supplied from the secondary battery, and a switch element disposed between the secondary battery and the load, the switch element remaining in an off state until a user starts use of the electrical apparatus.

According to the present invention, there is further provided an electrical apparatus including a secondary battery, a load which operates by power supplied from the secondary battery, and a time measurement circuit configured to carry out measurement of a date and time at present by power supplied from the secondary battery, the electrical apparatus operating in one of a plurality of operation modes including a normal operation mode in which the load operates, a power down mode in which the operation of the load stops and measurement of a date and time at present by the time measurement circuit is carried out, and a shipment mode in which operation of both of the load and the time measurement circuit stops.

According to the present invention, there is provided a control circuit for use in an electrical apparatus, including a switch element disposed between a secondary battery built in the electrical apparatus and a load, and a control element configured to keep the switch element in an off state before a user starts use of the electrical apparatus and switch on the switch element when the user starts use of the electrical apparatus.

BRIEF DESCRIPTION OF DRAWINGS

FIG. 3 is a flow chart illustrating a control flow when the electrical apparatus according to the present embodiment ends the shipment mode in response to a switching-on operation of a power supply switch by a user.

FIG. 4 is a flow chart illustrating a control flow when the electrical apparatus according to the present embodiment ends the shipment mode in response to starting of supply of power through a connection terminal.

DESCRIPTION OF EMBODIMENTS

Figure 1:
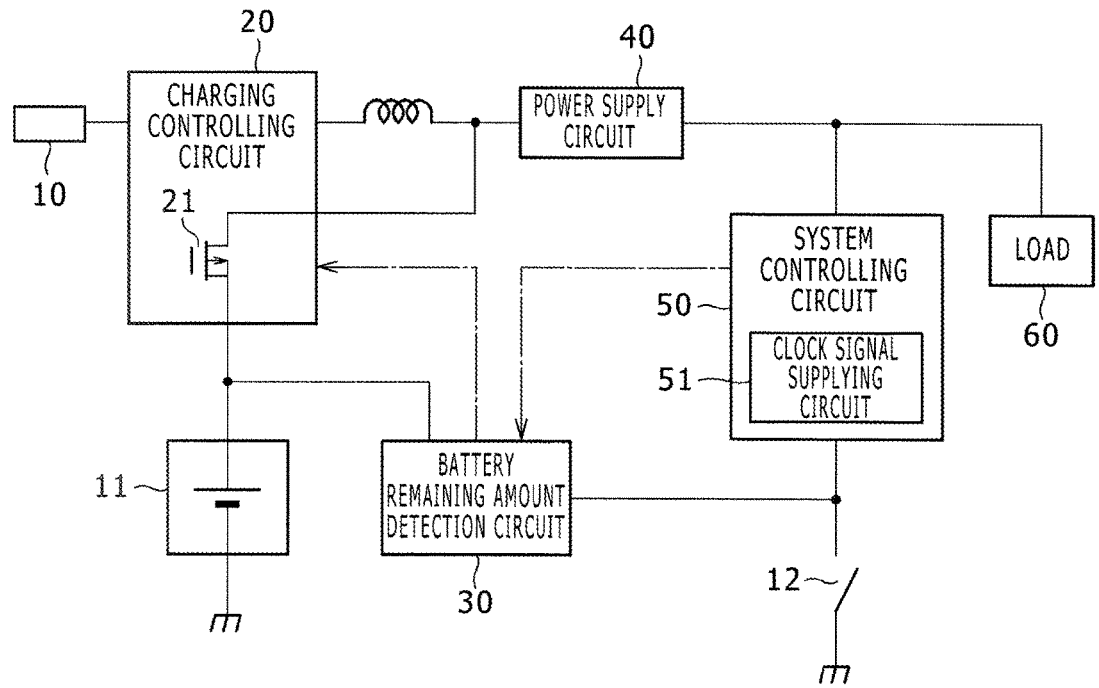
FIG. 1 is a circuit block diagram of an electrical apparatus according to an embodiment of the present invention.

According to an embodiment of the present invention, an electrical apparatus includes a secondary battery, a load which operates by power supplied from the secondary battery, and a switch element disposed between the secondary battery and the load, the switch element remaining in an off state before a user starts use of the electrical apparatus.

The electrical apparatus may further include a power supply switch, and a monitoring circuit configured to monitor a state of the power supply switch, the monitoring circuit being connected to the secondary battery directly without the intervention of the switch element, the switch element being switched on when the monitoring circuit detects an operation for switching on the power supply switch.

Alternatively, the electrical apparatus may further include a connection terminal configured to accept power supply from an external power supply source, the switch element being switched on when power supply from the external power supply source to the connection terminal is started.

Alternatively, the electrical apparatus may further include a time measurement circuit configured to measure a date and time at present, the switch element being disposed between the secondary battery and the time measurement circuit.

The electrical apparatus may further include a charging controlling circuit configured to control charging of the secondary battery, the switch element being disposed in the charging controlling circuit.

According to another embodiment of the present invention, there is provided an electrical apparatus including a secondary battery, a load which operates by power supplied from the secondary battery, and a time measurement circuit configured to carry out measurement of a date and time at present by power supplied from the secondary battery, the electrical apparatus operating in one of a plurality of operation modes including a normal operation mode in which the load operates, a power down mode in which the operation of the load stops and measurement of a date and time at present by the time measurement circuit is carried out and a shipment mode in which operation of both of the load and the time measurement circuit stops.

The electrical apparatus may further include a power supply switch, and a monitoring circuit configured to monitor a state of the power supply switch, the monitoring circuit operating by power supplied from the secondary battery also in the shipment mode, the electrical apparatus ending the operation in the shipment mode when the monitoring circuit detects an operation for switching on the power supply switch.

Or, the electrical apparatus may further include a connection terminal configured to accept power supply from an external power supply source, the operation of the electrical apparatus in the shipment mode being ended when the power supply from the external power supply source to the connection terminal is started.

In the following, an embodiment of the present invention is described in detail with reference to the drawings.

FIG. 1 is a circuit diagram of an electrical apparatus 1 according to an embodiment of the present invention. As shown in FIG. 1, the electrical apparatus 1 includes a connection terminal 10, a secondary battery 11, a power supply switch 12, a charging controlling circuit 20, a battery remaining amount detection circuit 30, a power supply circuit 40, a system controlling circuit 50, and a load 60. It is to be noted that the charging controlling circuit 20, battery remaining amount detection circuit 30, power supply circuit 40 and system controlling circuit 50 may each be an integrated circuit or the like. In FIG. 1, alternate long and short dash lines indicate control signal lines used to input control signals. The electrical apparatus 1 may be any apparatus which operates using the secondary battery 11 as a power supply source such as, for example, a portable game machine, a portable telephone set or a personal computer.

The connection terminal 10 is a terminal connected to an external electric power supply source (an AC adapter, a USB host apparatus or the like which supplies electric power, for example, from a commercial power supply). Charging of the secondary battery 11 is carried out by the power supply from the power supply source connected to the connection terminal 10.

The secondary battery 11 is a rechargeable battery such as a lithium-ion battery, and is charged by the power supplied from the outside of the electrical apparatus 1 and supplies the power accumulated therein by the charging to the load 60 in the electrical apparatus 1.

The power supply switch 12 is a switch disposed on the surface of a housing of the electrical apparatus 1 and configured to be operated by a user. If the power supply switch 12 is switched on, then operation of the load 60 is started under the control of the system controlling circuit 50.

The charging controlling circuit 20 supplies power supplied from the power supply source connected to the connection terminal 10 to the secondary battery 11 to charge the secondary battery 11. Further, the charging controlling circuit 20 outputs the power accumulated in the secondary battery 11 to the power supply circuit 40. The charging controlling circuit 20 has a switch element 21 built therein. This switch element 21 is, for example, an FET or the like and is disposed halfway of a wiring line which connects the secondary battery 11 to the connection terminal 10, power supply circuit 40, system controlling circuit 50, load 60 and so forth. Therefore, if the switch element 21 is switched to an off state (disconnection), then the secondary battery 11 is electrically disconnected from all of the connection terminal 10, power supply circuit 40, system controlling circuit 50 and load 60. The charging controlling circuit 20 monitors the battery voltage, charging current or the like of the secondary battery 11 to determine the arrival of an ending timing of charging. When the timing at which the charging is to be ended arrives, then the charging controlling circuit 20 switches off the switch element 21 to end the charging. On the contrary, when the secondary battery 11 is charged or when the load 60 is to be operated by the power supplied from the secondary battery 11, or in a like case, the switch element 21 normally indicates an on (conducting) state.

The battery remaining amount detection circuit 30 is connected in parallel to the secondary battery 11 directly without the intervention of the charging controlling circuit 20 and includes a function for detecting a battery remaining amount of the secondary battery 11 using information of the voltage or the like of the secondary battery 11. Further, the battery remaining amount detection circuit 30 is connected to the power supply switch 12 and detects, when the power supply switch 12 is switched from an off state to an on state by the user, that the switching operation has been carried out. In particular, the battery remaining amount detection circuit 30 functions also as a monitoring circuit which monitors the state of the power supply switch 12. Further, the battery remaining amount detection circuit 30 detects whether or not the secondary battery 11 is connected and notifies the charging controlling circuit 20 of a result of the detection. In particular, when the secondary battery 11 is removed from the main body of the electrical apparatus 1, the battery remaining amount detection circuit 30 detects this and outputs a control signal for the notification of the absence of the secondary battery 11 to the charging controlling circuit 20. When this control signal is inputted, the charging controlling circuit 20 switches off the switch element 21 so that the power supply voltage inputted to the connection terminal 10 is not outputted to the secondary battery 11 side.

The power supply circuit 40 transforms the power supplied thereto from the secondary battery 11 into a predetermined voltage and outputs the voltage to the system controlling circuit 50 and the load 60.

The system controlling circuit 50 is a circuit which controls operation of the other circuits in the electrical apparatus 1. In particular, the system controlling circuit 50 is connected to the power supply switch 12 and causes operation of the load 60 to be started when the power supply switch 12 is switched on. Further, in the present embodiment, the system controlling circuit 50 has a clock signal supplying circuit 51 built therein, and this clock signal supplying circuit 51 carries out time measurement of the date and type at present using a clock signal supplied from the clock signal supplying circuit 51. In other words, the system controlling circuit 50 functions also as a time measurement circuit (real time clock). The clock signal supplying circuit 51 is configured including, for example, a quartz oscillator and so forth. It is to be noted that the system controlling circuit 50 operates by the power supplied thereto from the secondary battery 11 through the charging controlling circuit 20 and the power supply circuit 40. Further, the system controlling circuit 50 can operate also by the power supplied from a power supply source connected to the connection terminal 10.

The load 60 is a circuit for implementing an inherent function of the electrical apparatus 1. Where the electrical apparatus 1 is an information processing apparatus such as, for example, a portable game machine, the load 60 includes an arithmetic operation element, a storage element and so forth. While the power supply switch 12 remains on, the load 60 operates by the power supplied thereto from the secondary battery 11 through the charging controlling circuit 20 and the power supply circuit 40.

In the following, operation modes of the electrical apparatus 1 are described. Usually, the electrical apparatus 1 operates in one of a normal operation mode, a standby mode and a power down mode. The normal operation mode and the standby mode are operation modes in which the load 60 operates in a state in which the power supply switch 12 is in an on state. However, in the standby mode, some circuit in the load 60 stops or the electrical apparatus 1 operates in a power-saving state, and consequently, the entire electrical apparatus 1 operates in a power-saving state in comparison with that in the normal operation mode. On the other hand, the power down mode is an operation mode in which, in a state in which the power supply switch 12 is in an off state, only part of the circuitry including the system controlling circuit 50 operates. In the power down mode, the load 60 stops its operation. Therefore, in the power down mode, the power consumption of the electrical apparatus 1 is further lower than that in the standby mode. However, also in the power down mode, the system controlling circuit 50 operates by the power supplied from the secondary battery 11. Consequently, also while the power supply switch 12 is off, the electrical apparatus 1 can continue time measurement of the date and time at present using the clock signal supplied from the clock signal supplying circuit 51. The user can switch the operation mode of the electrical apparatus 1 between the normal operation mode or the standby mode and the power down mode by operating the power supply switch 12.

Further, in the preset embodiment, the electrical apparatus 1 can operate in a shipment mode. The shipment mode is a mode in which the electrical apparatus 1 operates in a further power-saving state than in the power down mode. In the shipment mode, the power supply from the secondary battery 11 to the power supply circuit 40, system controlling circuit 50 and load 60 is stopped completely. In particular, upon transition to the shipment mode, the electrical apparatus 1 switches off the switch element 21 in the charging controlling circuit 20 to cut the electric connection between the secondary battery 11 and the power supply circuit 40, system controlling circuit 50 and load 60. Further, in the shipment mode, also the battery remaining amount detection circuit 30 executes only the monitoring of the power supply switch 12 and operates in a power-saving state from that in the normal operation. It is to be noted that, since the battery remaining amount detection circuit 30 is connected to the secondary battery 11 without the intervention of the charging controlling circuit 20, also after the switch element 21 is switched off, the battery remaining amount detection circuit 30 can operate by the power supplied from the secondary battery 11. In this state, the power supply to the system controlling circuit 50 which functions as a time measurement circuit is stopped, and therefore, the electrical apparatus 1 cannot carry out time measurement of the date and time at present. Therefore, after the shipment mode is ended and the system controlling circuit 50 starts its operation, it is necessary for the user to carry out a time adjustment work for adjusting the time information stored in the electrical apparatus 1 to the date and time at present by manual operation.

In the present embodiment, also in the shipment mode, power supply from the secondary battery 11 is carried out to part of the battery remaining amount detection circuit 30 and the charging controlling circuit 20. Therefore, also in the shipment mode, the power consumption of the electrical apparatus 1 cannot be reduced to zero. However, in the shipment mode, since also the battery remaining amount detection circuit 30 operates by lower power consumption and the power supply to the system controlling circuit 50 and the system controlling circuit 50 is stopped completely, the power consumption of the entire electrical apparatus 1 is much lower than that in the power down mode. Therefore, in the shipment mode, reduction of the battery capacity of the secondary battery 11 can be suppressed. Further, by connecting the battery remaining amount detection circuit 30 to the power supply switch 12 such that the battery remaining amount detection circuit 30 operates by low power consumption, also in the shipment mode, the electrical apparatus 1 can monitor the state of the power supply switch 12. If the battery remaining amount detection circuit 30 detects that the power supply switch 12 is switched from an off state to an on state, then the electrical apparatus 1 executes control to cause transition from the shipment mode to a different operation mode to be carried out. A particular example of this control is hereinafter described.

Figure 2:
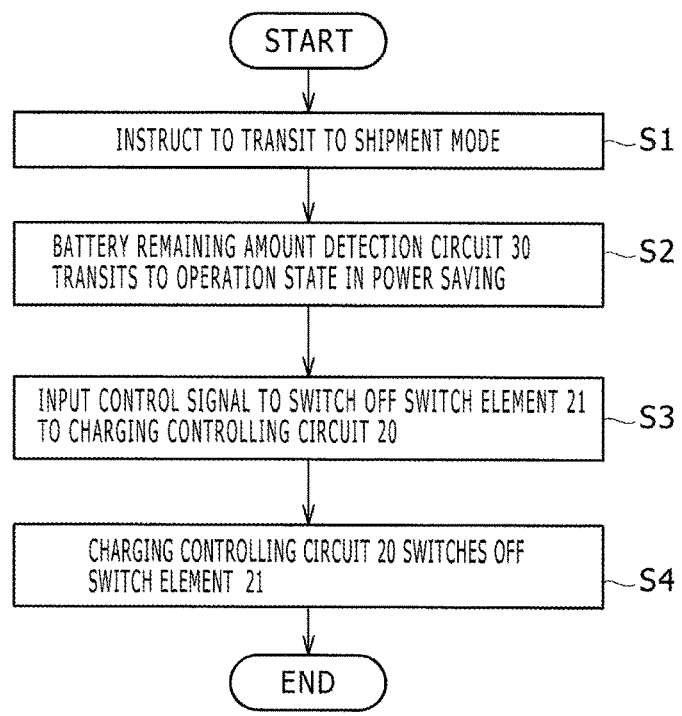
FIG. 2 is a flow chart illustrating a control flow executed by the electrical apparatus according to the present embodiment upon transition to a shipment mode.

In the following, control upon transition to the shipment mode is described with reference to a flow chart of FIG. 2. This control is normally executed after the electrical apparatus 1 is manufactured in a factory until it is shipped from the factory. However, the execution timing is not limited to this, but the control may be executed at some point of time after the electrical apparatus 1 is shipped from the factory until it is delivered to a user.

First, in response to an instruction from the outside, the system controlling circuit 50 inputs a control signal to the battery remaining amount detection circuit 30 to cause transition to the shipment mode (S1). It is to be noted that, in order to avoid a situation that the battery remaining amount detection circuit 30 transits to the shipment mode in error after a user starts use of the electrical apparatus 1, when the system controlling circuit 50 issues an instruction for the transition to the shipment mode, it may input a plurality of control signals at the same timing to the battery remaining amount detection circuit 30 through a plurality of control signal lines independent of each other. In this instance, the battery remaining amount detection circuit 30 carries out the transition operation to the shipment mode only when a plurality of control signals are inputted at the same time through the plural control signal lines.

When the battery remaining amount detection circuit 30 receives the control signal inputted thereto, it causes the battery remaining amount detection circuit 30 itself to transit to a state in which it operates by low power consumption (S2). Then, the battery remaining amount detection circuit 30 inputs a control signal for the notification that the secondary battery 11 does not exist to the charging controlling circuit 20 (S3). In other words, although the secondary battery 11 actually remains connected, the battery remaining amount detection circuit 30 issues a notification that the secondary battery 11 has been removed to the charging controlling circuit 20. The charging controlling circuit 20 receives the notification and switches off the switch element 21 (S4). The charging controlling circuit 20 inherently includes a function for switching off the switch element 21 in response to the notification from the battery remaining amount detection circuit 30 in order to stop power supply to the secondary battery 11 side when the secondary battery 11 is removed. However, upon transition to the shipment mode, as a notification representing that the secondary battery 11 has been placed out of existence is issued despite that the secondary battery 11 actually exists, the charging controlling circuit 20 switches off the switch element 21 to stop the power supply from the secondary battery 11 to the power supply circuit 40. Thereafter, the connection between the secondary battery 11 and the power supply circuit 40 is electrically cut, and consequently, the power consumption of the power supply circuit 40, system controlling circuit 50 and load 60 reduces to zero.

Now, control upon returning from the shipment mode is described. In the present embodiment, the electrical apparatus 1 ends the shipment mode in response to one of events of a switching on operation of the power supply switch 12 and starting of power supply from an external power supply through the connection terminal 10. After the electrical apparatus 1 shipped in a state in which it is set to the shipment mode, when the user tries to use the electrical apparatus 1, the user will first switch on the power supply switch 12 or carry out charging of the electrical apparatus 1. Therefore, by ending the shipment mode in response to one of the two events described above, the electrical apparatus 1 can end the shipment mode to transit to the normal operation mode or the power supply stop mode without causing the user to carry out a special operation.

In the following, a particular example of the returning control from the shipment mode is described. First, control when the shipment mode is ended in response to a switching on operation of the power supply switch 12 by a user is described with reference to a flow chart of FIG. 3.

As described hereinabove, also in the shipment mode, the battery remaining amount detection circuit 30 operates by reduced power consumption and monitors the state of the power supply switch 12. If the user switches the power supply switch 12 from an off state to an on state, then the battery remaining amount detection circuit 30 detects the switching on operation (S11) and changes the operation state of the battery remaining amount detection circuit 30 itself from the state in which the battery remaining amount detection circuit 30 operates in a power-saving state to the normal operation state (S12). Further, the battery remaining amount detection circuit 30 stops the outputting, started by the process at step S3 described hereinabove, of the control signal representing that the secondary battery 11 does not exist (S13). In response to this, the charging controlling circuit 20 switches on the switch element 21 (S14). Consequently, power supply from the secondary battery 11 to the system controlling circuit 50 and the load 60 is started and the electrical apparatus 1 starts operation in the normal operation mode (S15).

Now, control when the shipment mode is ended in response to starting of power supply through the connection terminal 10 is described with reference to a flow chart of FIG. 4.

If the user connects an AC adapter or the like to the connection terminal 10 to start power supply through the connection terminal 10, then power supplied from the connection terminal 10 is supplied to the system controlling circuit 50 through the charging controlling circuit 20 and the power supply circuit 40 (S21). Consequently, the system controlling circuit 50 which has been in a stopping state till then starts operation (S22). After the system controlling circuit 50 starts operation, it signals a control signal for inquiring about a state to the components of the electrical apparatus 1 including the battery remaining amount detection circuit 30 in order to grasp the state of the components (S23). The battery remaining amount detection circuit 30 accepts the control signal and switches the operation state of the battery remaining amount detection circuit 30 itself from the state in which the electrical apparatus 1 operates by reduced power to the normal operation state (S24). Further, the battery remaining amount detection circuit 30 stops the outputting of the control signal representing that the secondary battery 11 does not exist similarly as in the process at step S13 described hereinabove (S25). In response to this, the charging controlling circuit 20 switches on the switch element 21 (S26). Consequently, the shipment mode is ended, and the electrical apparatus 1 stops the operation in the power down mode and starts charging of the secondary battery 11 by the power inputted from the connection terminal 10 (S27).

As described above, the electrical apparatus 1 according to the present embodiment operates in the shipment mode in which electric connection between the power supply circuit 40, system controlling circuit 50, load 60 and so forth and the secondary battery 11 is cut before a user purchases and actually starts use of the electrical apparatus 1. Therefore, reduction of the battery capacity of the secondary battery 11 can be suppressed. Consequently, even if a comparatively long period of time elapses before the user starts to use the electrical apparatus 1, the possibility that it may be possible to start to use the electrical apparatus 1 immediately by the power accumulated in the secondary battery 11 is enhanced. Further, although the power supply to the power supply circuit 40, system controlling circuit 50 and load 60 stops in the shipment mode in this manner, the electrical apparatus 1 can end, in response to a switching on operation of the power supply switch 12 or starting of power supply to the connection terminal 10, the shipment mode and start operation in the normal operation mode or the power down mode. Therefore, there is no necessity to cause the user to carry out a special operation in order to end the shipment mode.

It is to be noted that the embodiment of the present invention is not limited to that described above. For example, it is described in the foregoing description that the battery remaining amount detection circuit 30 inputs a control signal for the notification of starting/ending of the shipment mode to the charging controlling circuit 20, and the charging controlling circuit 20 receives this control signal and switches the switch element 21 between an on state and an off state. However, conversely the charging controlling circuit 20 may monitor the state of the battery remaining amount detection circuit 30 and switch off, when the battery remaining amount detection circuit 30 transits to a state in which it operates by in a power saving state, the switch element 21 to start the shipment mode, whereafter the battery remaining amount detection circuit 30 switches on, when the battery remaining amount detection circuit 30 returns from the state in which it operates in a power saving state to the normal operation state, the switch element 21 to end the shipment mode.

Further, it is described in the foregoing description that, during operation in the shipment mode, the battery remaining amount detection circuit 30 monitors a switching on operation of the power supply switch 12. However, what monitors a switching on operation of the power supply switch 12 may be a different circuit than the battery remaining amount detection circuit 30. Further, while it is described in the foregoing description that the switch element 21 is disposed in the charging controlling circuit 20 and the charging controlling circuit 20 controls on/off operations of the switch element 21, the disposition of the switch element 21 is not limited to this. A switch for electrically cutting the connection between the secondary battery 11 and the power supply circuit 40, system controlling circuit 50 and load 60 may be disposed at a different place.

The invention claimed is:

1. An electrical apparatus, comprising:
a secondary battery;
a load which consumes power supplied from the secondary battery to implement a function required for the electrical apparatus;
a switch element disposed between the secondary battery and the load;
a battery remaining amount detection circuit configured to detect a battery remaining amount of the secondary battery; and
a charging controlling circuit configured to control charging of the secondary battery,
wherein the switch element remaining in an off state until use of the electrical apparatus is started by a user,
wherein when the secondary battery is removed from the electrical apparatus, the battery remaining amount detection circuit outputs a control signal for notification of absence of the secondary battery to the charging controlling circuit;
wherein when the control signal for the notification of the absence of the secondary battery is inputted, the charging controlling circuit switches off the switch element; and
wherein the battery remaining amount detection circuit, which receives a control signal to cause transition to a shipment mode in response to an instruction from outside, outputs the control signal for the notification of the absence of the secondary battery to the charging controlling circuit.

2. The electrical apparatus according to claim 1, further comprising:
a power supply switch for starting operation of the load; and
a monitoring circuit configured to monitor a state of the power supply switch;
the monitoring circuit being connected to the secondary battery directly without the intervention of the switch element;
the switch element being switched on when the monitoring circuit detects an operation for switching on the power supply switch.

3. The electrical apparatus according to claim 1, further comprising:
a connection terminal configured to accept power supply from an external power supply source;
the switch element being switched on when power supply from the external power supply source to the connection terminal is started.

4. The electrical apparatus according to claim 1, further comprising:
a time measurement circuit configured to measure a date and time at present;
the switch element being disposed between the secondary battery and the time measurement circuit.

5. The electrical apparatus according to claim 1 wherein
the switch element is disposed in the charging controlling circuit.

6. A control circuit for use in an electrical apparatus, comprising:
a switch element disposed between a secondary battery built in the electrical apparatus and a load which consumes power supplied from the secondary battery to implement a function required for the electrical apparatus;
a control element configured to keep the switch element in an off state until use of the electrical apparatus is started by a user and switch on the switch element when use of the electrical apparatus is started by the user,
a battery remaining amount detection circuit configured to detect a battery remaining amount of the secondary battery; and
a charging controlling circuit configured to control charging of the secondary battery,
wherein when the secondary battery is removed from the electrical apparatus, the battery remaining amount detection circuit outputs a control signal for notification of absence of the secondary battery to the charging controlling circuit;
wherein when the control signal for the notification of the absence of the secondary battery is inputted, the charging controlling circuit switches off the switch element; and
wherein the battery remaining amount detection circuit, which receives a control signal to cause transition to a shipment mode in response to an instruction from outside, outputs the control signal for the notification of the absence of the secondary battery to the charging controlling circuit.

* * * * *